United States Patent [19]

Raskas

[11] Patent Number: 5,430,621
[45] Date of Patent: Jul. 4, 1995

[54] ILLUMINATIBLE SHOELACE DEVICE

[75] Inventor: Eric J. Raskas, St. Louis, Mo.

[73] Assignee: Solefound, Inc., St. Louis, Mo.

[21] Appl. No.: 285,070

[22] Filed: Aug. 3, 1994

[51] Int. Cl.⁶ .............................................. F21V 7/04
[52] U.S. Cl. ...................................... 362/32; 362/103
[58] Field of Search .................................. 362/32, 103

[56] References Cited

U.S. PATENT DOCUMENTS

| | | | |
|---|---|---|---|
| 4,296,459 | 10/1981 | Deluka | 362/32 |
| 4,422,719 | 12/1983 | Orcutt | 362/32 |
| 4,652,981 | 3/1987 | Glynn | 362/103 |
| 4,727,603 | 3/1988 | Howard | 2/243 |
| 4,839,777 | 6/1989 | Janko et al. | 362/108 |
| 4,848,009 | 7/1989 | Rodgers | 36/137 |
| 4,935,851 | 6/1990 | Wood | 362/103 |
| 5,027,259 | 6/1991 | Chuiko | 362/32 |
| 5,149,489 | 9/1992 | Crews | 362/32 |
| 5,151,678 | 9/1992 | Veltri et al. | 340/321 |

*Primary Examiner*—Carroll B. Dority
*Attorney, Agent, or Firm*—Haverstock, Garrett & Roberts

[57] ABSTRACT

An illuminatible shoelace device is disclosed which comprises a section of flexible material having a cavity within the section and the section having a pair of ends, a fiber optic section is positioned within the cavity with a light source coupled to an end of the fiber optic section, a power supply is provided to power the light source, and switching circuitry, associated with the light source and the power supply, switches the light source on and off for transmitting light through the fiber optic section with the transmitted light illuminating the fiber optic section and the section of flexible material.

13 Claims, 2 Drawing Sheets

ILLUMINATIBLE SHOELACE DEVICE

BACKGROUND OF THE INVENTION

The present invention relates to articles having light emitting fibers or strands and in particular to a shoelace having light emitting strands throughout the lace.

Various articles of clothing have been developed which include light emitting devices such as light bulbs, light emitting diodes, or fiber optics. Some examples of such articles of clothing include jackets, shirts, belts, shoes, and ski boots and are disclosed in U.S. Pat. Nos. 4,652,981; 4,727,603; 4,839,777; 4,935,851; and 5,151,678. Such illuminated devices have been used for at least two purposes. One purpose is to decorate or embellish a particular design fabricated on the article of clothing. The other purpose is to provide a safety indicator on the article to illuminate a person such as a jogger at night or other periods when an object is not easily visible.

Light emitting fibers or strands, such as fiber optic cables, are used to transmit light from a light source along the length of the fiber to be emitted from an end of the fiber. While light emitting fibers have been employed in the past in various articles of clothing as discussed above, their use has not gained wide acceptance probably due to the difficulty in manufacturing such devices and the cost in manufacturing such devices. There remains a need to provide a simple and easy to use illuminatible shoelace device. An illuminatible shoelace device would provide decoration and also function as a safety indicator.

SUMMARY OF THE INVENTION

The light emitting article of the present invention comprises a section of flexible material having a cavity along a potion of the length of the section and a pair of ends, a pair of fiber optic sections positioned within the cavity, a light source intermediate the pair of fiber optic sections, means for supplying power to the light source, and and means, associated with the light source and the supplying means, for switching the light source on and off for transmitting light through each of the fiber optic sections.

In another form of the present invention, an illuminatible shoelace device comprises a section of flexible material having a cavity within the section and the section having a pair of ends, a pair of fiber optic sections each positioned within the cavity, a light source coupled to an end of each of the fiber optic sections, means for supplying power to the light source, and means, associated with the supplying means and the light source, for switching the light source on and off for transmitting light through each of the fiber optic sections with the transmitted light illuminating the fiber optic sections and the section of flexible material, the switching means adapted to turn the light source on and off upon detection of movement of the device.

Another form of the present is an illuminatible shoelace device which comprises a section of flexible material having a cavity within the section and the section having a pair of ends, a first fiber optic section positioned within the cavity and a second fiber optic section positioned within the cavity, a first light source coupled to the first fiber optic section and a second light source coupled to the second fiber optic section, means for supplying power to the light sources, and means, associated with the light source and the supplying means, for switching the light sources on and off for transmitting light through of the first and second fiber optic sections with the transmitted light illuminating the first and second fiber optic sections and the section of flexible material.

In light of the foregoing comments, it will be recognized that a principal object of the present invention is to provide an illuminatible shoelace device.

A further object of the invention is to provide an illuminatible shoelace device which is of simple construction and design and which can be easily employed with highly reliable results.

Another object of the present invention is to provide an illuminatible shoelace device which is both decorative and easily visible during low light conditions.

Still another object of the present invention is to provide an illuminatible shoelace device which does not require any modification to an existing shoe and can easily replace existing shoelaces.

Another object of the present invention is to provide an improved light emitting article.

These and other objects and advantages of the present invention will become apparent after considering the following detailed specification in conjunction with the accompanying drawings, wherein:

DETAILED DESCRIPTION OF THE PREFERRED EMBODIMENTS

Figure 1:
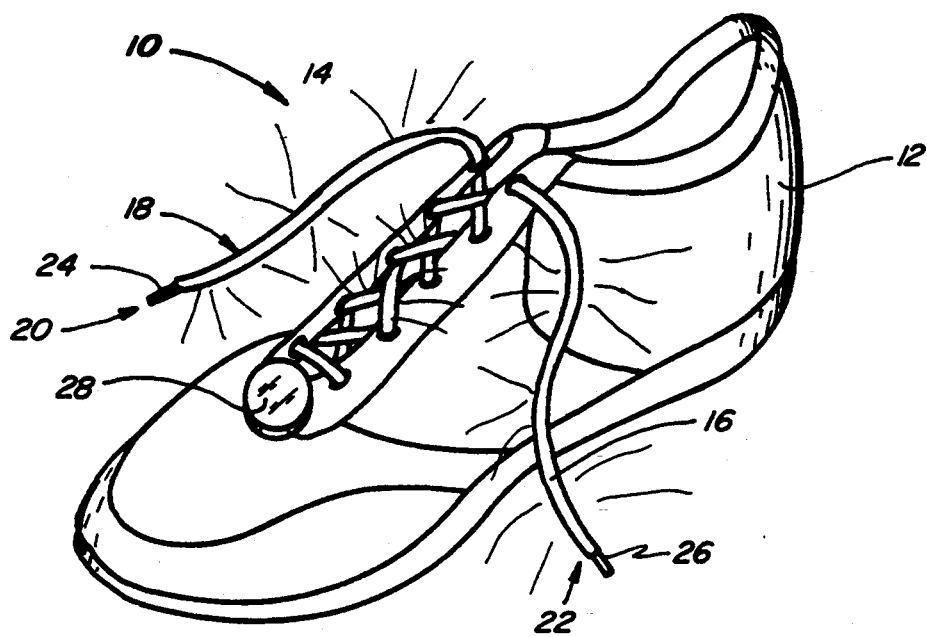
FIG. 1 is a perspective view of an illuminatible shoelace device constructed according to the present invention shown laced on a shoe.

Referring now to the drawings, wherein like numerals refer to like items, number 10 identifies a preferred embodiment of an illuminatible shoelace device which is constructed according to the present invention. With reference to FIG. 1, the illuminatible shoelace device 10 is shown laced on a shoe 12, such as an athletic shoe. The device 10 includes a pair of lace sections 14 and 16 which are formed from a single section of a flexible material 18 which may be constructed of a woven material such as a woven polyester. The section of flexible material 18 includes a pair of ends 20 and 22 with each of the ends 20 and 22 having a tip portion 24 and 26, respectively. A housing 28 is positioned intermediate the section of flexible material 18.

Figure 2:
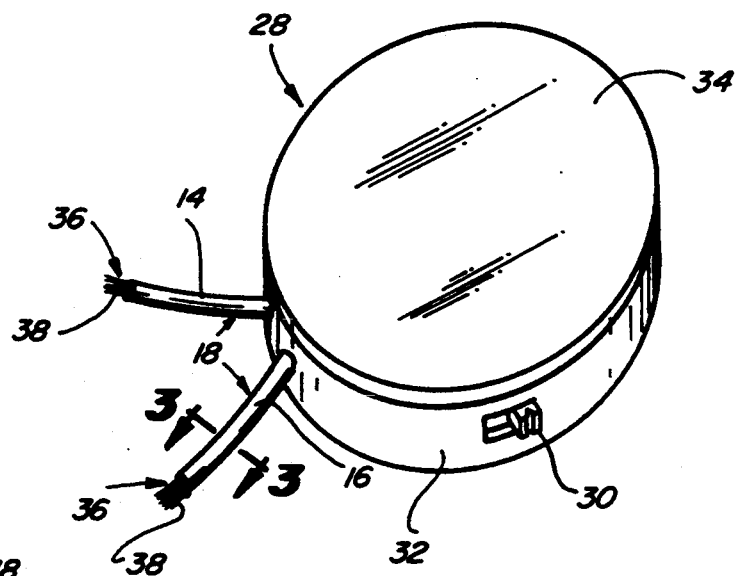
FIG. 2 is an enlarged perspective view of the illuminatible shoelace device of FIG. 1.

Referring now to FIG. 2, an enlarged perspective view of the device 10 is shown removed or unlaced from the shoe 12. The housing 28 includes a power switch 30 on an exterior side 32 of the housing 28. The lace sections 14 and 16 extend outwardly from the exterior side 32 of the housing 28. The housing 28 also has a top cover 34 which is removable to gain access to the interior of the housing 28. The section of flexible material 18 is shown broken away to illustrate that the section of flexible material 18 is hollow. A bundle 36 of fiber optic strands 38 is positioned within the section of flexible material 18. It is to be understood that the bundle 36 may also include a ribbon of fiber optic strands.

Figure 3:
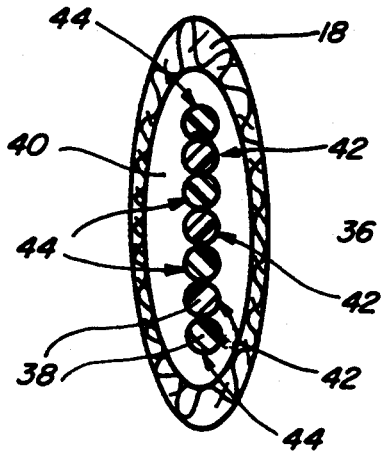
FIG. 3 is an enlarged cross-sectional view taken along the plane of line 3—3 of FIG. 2.

FIG. 3 depicts a cross-sectional view of the section of flexible material 18 taken along the plane of line 3—3 of FIG. 2. The section of flexible material 18 has a cavity 40 which extends along a portion of the length of the section 18 or the entire length of the section 18. The cavity 40 is terminated by the tip portions 24 and 26 as shown in FIG. 1. The bundle 36 of fiber optic strands 38 is positioned within the cavity 40. The bundle 36 extends throughout the entire cavity 40 of the section of flexible material 18 with the bundle 36 terminating at the tip portions 24 and 26 or just prior to the tip portions 24 and 26. Each one of the fiber optic strands 38 is of a conventional type manufactured of a flexible tubular plastic material which is capable of transmitting light that is emitted into one end of each of the strands 38. Typically, fiber optic strands transmit light from one end to the other end without any light escaping through the outer surface of the strand along the entire length of each strand. However, some of the strands 38 of the bundle 36 have outer surfaces 42 which have been modified by abrading the outer surfaces 42. Abrading the outer surfaces 42 allows light to escape through the exposed outer surfaces 42 to allow the strands 38 to give the appearance of glowing. Some of the other strands 38 of the bundle 36 have outer surfaces 44 which have not been modified or abraded. Additionally, it is also possible to abrade a portion of the length of each of the strands 38 to provide certain light effects or to produce decorative designs. One method of abrading the outer surfaces 42 is to sand the outer surfaces 42.

Figure 4:
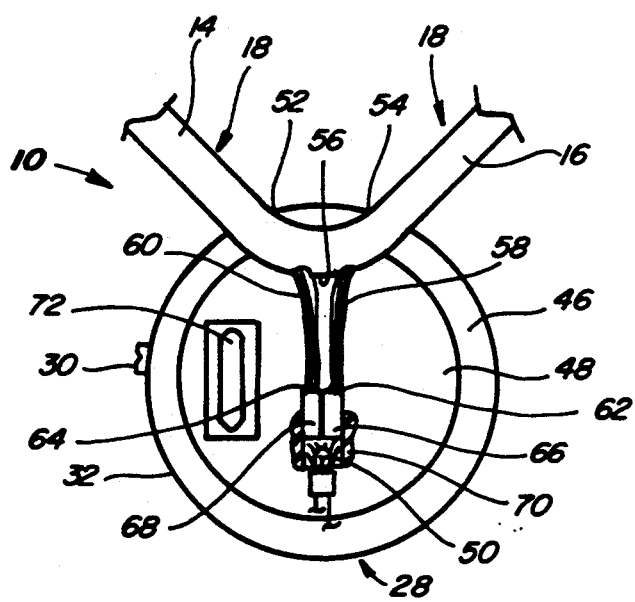
FIG. 4 is an enlarged top plan view of the illuminatible shoelace device of FIG. 2 with its top cover removed.

With reference now to FIG. 4, the top cover 34 has been removed from the housing 28 to illustrate the interior of the housing 28 and the manner in which the strands 38 are connected within the housing 28. The housing 28 includes a main body 46 having a circuit board 48 positioned within the main body 46. The circuit board 48 has a light emitting diode (LED) 50 connected to the circuit board 48. The section of flexible material 18 has been laced through two openings 52 and 54 in the side 32 of the housing 28. Once the section of flexible material 18 has been laced through the openings 52 and 54, the bundle 36 is removed through an opening 56 formed in the section of flexible material 18 and cut to form to form two sections 58 and 60 within the housing 28. The section of flexible material 18 is not cut in half to insure that the section of flexible material 18 has enough strength to function as a shoelace or lace. The two sections 58 and 60 each have an end 62 and 64, respectively. Each of the ends 62 and 64 has a sleeve or tube 66 and 68, respectively, inserted over the ends 62 and 64. The tubes 66 and 68 may be a heat shrink type tubing. The ends 62 and 64 are optically coupled to the LED 50 and optical cement 70 is used to adhere the ends 62 and 64 and the tubes 66 and 68 to the LED 50 and the circuit board 48. The optical cement 70 is the type of cement which is cured by using UV light. Additionally, the optical cement 70 provides for a water tight seal around the ends 62 and 64 and the LED 50. The LED 50 may also have its top surface ground flat to provide for optimal optical coupling between the ends 62 and 64 and the LED 50.

Light transmitted from the LED 50 will enter the ends 62 and 64 of the fiber optic strands 38 of the two sections 58 and 60. The light will be transmitted from each of the ends 62 and 64 through the strands 38 and will be allowed to escape through the exposed portions of the outer surfaces 42. Additionally, light would be seen as being transmitted out of the section of flexible material 18. This gives the appearance of the lace portions 14 and 16 glowing or giving off light. The circuit board 48 also has a motion sensor 72 and the power switch 32 connected to the circuit board 48.

Figure 5:
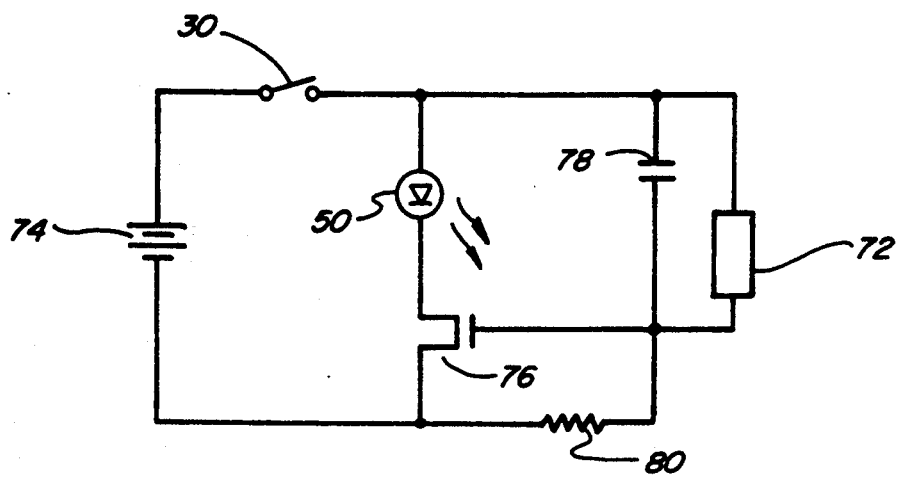
FIG. 5 is a schematic diagram of the illuminatible shoelace device of the present invention.

FIG. 5 illustrates a schematic circuit diagram of the illuminatible shoelace device 10. The illuminatible shoelace device 10 includes the battery 74 which is a power supply such as a lithium battery of about 3 V. The battery 74 is easily removable for replacement with a new or fully charged battery. The power switch 30 is connected in series with the battery 74. The LED 50, which serves as a light source, is connected between the power switch 302 and a transistor 76. An example of the type of transistor 76 to be used in this circuit is a 2N7000 transistor. The LED 50 and transistor 76 are connected across a capacitor 78 and a resistor 80. An example of a suitable capacitor 78 is a 0.82 microfarad capacitor and an example of a suitable resistor 80 is a 1 meg ohm, one-eighth watt resistor. The motion sensor 72, such as a spring activated motion sensor, is connected across the capacitor 78. In operation, the power switch 30 is closed and power from the battery 74 is provided to the circuit. Movement of the device 10, such as when the user walks, is sensed by the sensor 72 which provides power to the LED 50 for a period of time. The LED 50 will be switched on and off by movement sensed by the sensor 72. Light from the LED 50 will be transmitted to the ends 62 and 64 of the two sections 58 and 60. Light will then be transmitted through the strands 38 and will be allowed to escape through the exposed sections of the outer surfaces 42 of each of the strands 38. This light will also be able to be viewed through the section of flexible material 18 since the section of flexible material 18 is able to transmit light.

Figure 6:
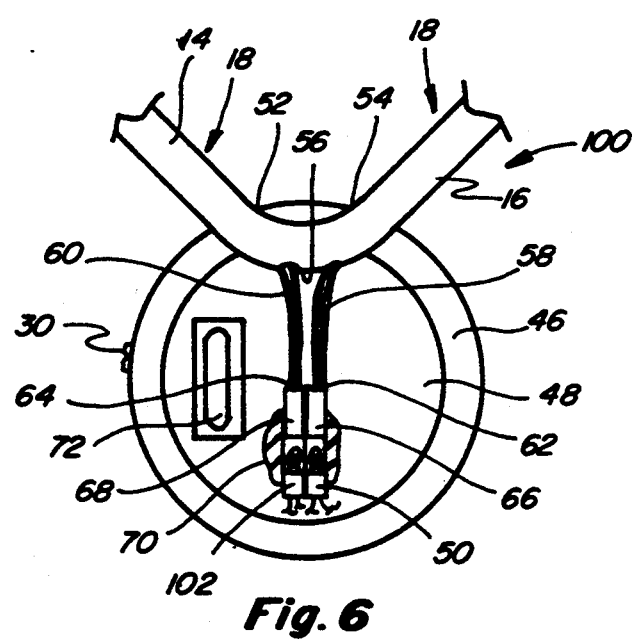
FIG. 6 is a top plan view of another embodiment of an illuminatible shoelace device constructed according to the present invention.

Referring now to FIG. 6, a second embodiment 100 of the illuminatible shoelace device is shown. The illuminatible shoelace device 100 is similar to the illuminatible shoelace device 10 shown in FIG. 4 and the same reference numbers have been used where appropriate. The main difference between the illuminatible shoelace device 100 and the illuminatible shoelace device 10 being a second LED 102 installed on the circuit board 48. The LED 50 may be a first, such as red, and the second LED 102 may be a second color such as yellow. When movement is detected by the motion sensor 72 of the illuminatible shoelace device 100, LED 50 and LED 102 would emit light and different color lights would be transmitted through the sections 58 and 60. Additionally, LED 50 and LED 102 may be the same color. Also, a plurality of light emitting diodes may be employed instead of LED 50 and LED 102. The plurality of light emitting diodes may be of the same color or different colors. Each one of the plurality of light sources is coupled to at least one of the fiber optic strands.

Although the preferred embodiments of the invention have been described and depicted hereinabove in terms of a shoelace, it should be recognized that it could be employed in other forms or other light emitting articles such as clothing, hairbands, hair ribbons, and ribbons for gifts.

From all that has been said, it will be clear that there has thus been shown and described herein an illuminatible shoelace device which fulfills the various objects and advantages sought therefor. It will be apparent to those skilled in the art, however, that many changes, modifications, variations, and other uses and applications of the subject illuminatible shoelace device are possible and contemplated. All changes, modifications, variations, and other uses and applications which do not depart from the spirit and scope of the invention are deemed to be covered by the invention, which is limited only by the claims which follow.

What is claimed is:

1. An illuminatible shoelace device comprising:
  a section of flexible material having a cavity within the section and the section having a pair of ends;
  a pair of fiber optic sections each positioned within the cavity;
  a light source coupled to an end of each of the fiber optic sections;
  means for supplying power to the light source; and
  means, associated with the supplying means and the light source, for switching the light source on and off for transmitting light through each of the fiber optic sections with the transmitted light illuminating the fiber optic sections and the section of flexible material, the switching means adapted to turn the light source on and off upon detection of movement of the device.

2. The light emitting article of claim 1 wherein the light source is a light emitting diode.

3. The light emitting article of claim 1 wherein the switching means comprises a spring activated motion sensor.

4. The light emitting article of claim 1 wherein the fiber optic section comprises a bundle of fiber optic strands which extend from the light source to one of the ends of the section of flexible material.

5. The light emitting article of claim 4 wherein the fiber optic strands each have an outer surface and the outer surface is abraded to allow light to escape through the exposed outer surface.

6. The light emitting article of claim 1 wherein one of the fiber optic sections comprises a plurality of fiber optic strands and the light emitting article further comprises a plurality of light sources with at least one light source coupled to at least one end of one of the fiber optic strands.

7. An illuminatible shoelace device comprising:
  a section of flexible material having a cavity within the section and the section having a pair of ends;
  a first fiber optic section positioned within the cavity and a second fiber optic section positioned within the cavity;
  a first light source coupled to the first fiber optic section and a second light source coupled to the second fiber optic section;
  means for supplying power to the light sources; and
  means, associated with the light source and the supplying means, for switching the light sources on and off for transmitting light through the first and second fiber optic sections with the transmitted light illuminating the first and second fiber optic sections and the section of flexible material.

8. The illuminatible shoelace device of claim 7 wherein the first light source is a light emitting diode and the second light source is a light emitting diode.

9. The illuminatible shoelace device of claim 7 wherein the first light source is a light emitting diode of a first color and the second light source is a light emitting diode of a second color.

10. The illuminatible shoelace device of claim 7 wherein the switching means comprises a spring activated motion sensor.

11. The illuminatible shoelace device of claim 7 wherein the first fiber optic section comprises a bundle of fiber optic strands which extend from the first light source to one of the ends of the section of flexible material and the second fiber optic section comprises a bundle of fiber optic strands which extend from the second light source to one of the ends of the section of flexible material.

12. The illuminatible shoelace device of claim 11 wherein the fiber optic strands each have an outer surface and the outer surface is abraded to allow light to escape through the exposed outer surface.

13. The illuminatible shoelace device of claim 7 wherein one of the fiber optic sections comprises a plurality of fiber optic strands and the illuminatible shoelace device further comprises a plurality of light sources with at least one light source coupled to at least one end of one of the fiber optic strands.

* * * * *

UNITED STATES PATENT AND TRADEMARK OFFICE
CERTIFICATE OF CORRECTION

PATENT NO. : 5,430,621
DATED : July 4, 1995
INVENTOR(S) : Eric J. Raskas

It is certified that error appears in the above-indentified patent and that said Letters Patent is hereby corrected as shown below:

Column 1, line 37, "potion" should be --portion--.

Signed and Sealed this

Twelfth Day of September, 1995

Attest:

BRUCE LEHMAN

Attesting Officer        Commissioner of Patents and Trademarks